(12) United States Patent
Yan et al.

(10) Patent No.: US 10,641,600 B2
(45) Date of Patent: May 5, 2020

(54) REAL-TIME NORMALIZATION APPARATUS AND METHOD OF PHASE GENERATED CARRIER DEMODULATION IN SINUSOIDAL PHASE MODULATION INTERFEROMETER

(71) Applicant: ZHEJIANG SCI-TECH UNIVERSITY, Zhejiang (CN)

(72) Inventors: Liping Yan, Zhejiang (CN); Shihua Zhang, Zhejiang (CN); Benyong Chen, Zhejiang (CN)

(73) Assignee: ZHEJIANG SCI-TECH UNIVERSITY, Zhejiang (CN)

( * ) Notice: Subject to any disclaimer, the term of this patent is extended or adjusted under 35 U.S.C. 154(b) by 0 days.

(21) Appl. No.: 16/348,147

(22) PCT Filed: Aug. 29, 2018

(86) PCT No.: PCT/CN2018/103381
§ 371 (c)(1),
(2) Date: May 7, 2019

(87) PCT Pub. No.: WO2019/062466
PCT Pub. Date: Apr. 4, 2019

(65) Prior Publication Data
US 2019/0368860 A1   Dec. 5, 2019

(30) Foreign Application Priority Data

Sep. 30, 2017   (CN) .......................... 2017 1 0918522

(51) Int. Cl.
*G01B 9/02* (2006.01)
*G01D 5/353* (2006.01)
*H04L 27/233* (2006.01)

(52) U.S. Cl.
CPC ..... *G01B 9/02074* (2013.01); *G01D 5/35383* (2013.01); *H04L 27/2338* (2013.01)

(58) Field of Classification Search
CPC ................................................. G01B 9/02074
See application file for complete search history.

(56) References Cited

U.S. PATENT DOCUMENTS

| 10,151,573 B2 * | 12/2018 | Yan .......................... G01B 9/02 |
| 2006/0061771 A1 * | 3/2006 | Hill ..................... G03F 7/70516 |
| | | 356/510 |

(Continued)

FOREIGN PATENT DOCUMENTS

| CN | 103487133 | 1/2014 |
| CN | 105043243 | 11/2015 |

OTHER PUBLICATIONS

Serge Dubovitsky, Oliver P. Lay, and David J. Seidel, "Elimination of heterodyne interferometer nonlinearity by carrier phase modulation," Opt. Lett. 27, 619-621 (2002) (Year: 2002).*

(Continued)

*Primary Examiner* — Nathan M Cors
(74) *Attorney, Agent, or Firm* — JCIPRNET

(57) ABSTRACT

The present invention discloses a real-time normalization apparatus and method of the PGC demodulation in a sinusoidal phase modulation interferometer. An optical setup containing a measuring interferometer and a monitoring interferometer is constructed. An electro-optic phase modulator is placed in the common reference arm of the two interferometers. High-frequency sinusoidal wave modulation and low-frequency triangular wave modulation are applied to the electro-optic phase modulator at the same time. Sinusoidal modulation is used for generating phase carrier, and PGC demodulation is performed to obtain quadrature signals containing the phase information to be measured. Triangular wave modulation makes the quadra- (Continued)

ture signals change periodically. Ellipse fitting is performed on the Lissajous figure corresponding to the quadrature signals, and real-time normalization of the PGC demodulated quadrature signals is achieved. By calculating the variation of the phase difference between the two interference signals, the measured displacement is obtained, and nanometer scale displacement measurement is achieved.

5 Claims, 2 Drawing Sheets

(56) References Cited

U.S. PATENT DOCUMENTS

| | | | | |
|---|---|---|---|---|
| 2010/0045999 | A1* | 2/2010 | Tanimoto | G01J 9/02 |
| | | | | 356/450 |
| 2010/0268499 | A1* | 10/2010 | Holzapfel | G01B 9/0207 |
| | | | | 702/76 |

OTHER PUBLICATIONS

"International Search Report (Form PCT/ISA/210)", dated Oct. 31, 2018, pp. 1-5.

* cited by examiner

REAL-TIME NORMALIZATION APPARATUS AND METHOD OF PHASE GENERATED CARRIER DEMODULATION IN SINUSOIDAL PHASE MODULATION INTERFEROMETER

CROSS-REFERENCE TO RELATED APPLICATION

This application is a 371 application of an international PCT application serial no. PCT/CN2018/103381, filed on Aug. 29, 2018 which claims priority to and the benefit of China Patent Application No. 201710918522.3, filed on Sep. 30, 2017. The entirety of each of the above-mentioned patent applications is hereby incorporated by reference herein and made a part of this specification.

BACKGROUND OF THE INVENTION

1. Field of the Invention

The present invention belongs to the technical field of laser interferometric precision measurement, and particularly relates to a real-time normalization apparatus and method of phase generated carrier (PGC) demodulation in a sinusoidal phase modulation interferometer.

2. Description of Related Art

The sinusoidal phase modulation interferometry applies sinusoidal modulation on the optical path difference of an interferometer, and it adopts the phase generated carrier (PGC) demodulation to obtain the phase information of an interference signal. Because it has the advantages of simple phase modulation, high measurement accuracy, strong anti-interference ability, etc., the sinusoidal phase modulation interferometry has become an important high-precision measurement technique and widely used in the measurements of displacement, vibration, surface topography, micro angles and so on. The PGC demodulation has the beneficial effects of high sensitivity, wide dynamic range, good linearity, etc. Its phase carrier may be generated in two manners of internal modulation and external modulation. The internal modulation modulates the output wavelength by changing the current of the laser diode, achieving the modulation of optical path difference indirectly. It doesn't need to add an extra modulator, and the structure is compact. But the output light intensity of the laser diode is also modulated, which will introduce the amplitude modulation and result in a phase demodulation error. The external modulation directly modulates the optical path difference of the interferometer through an external modulator such as the piezoelectric tranducer or the electro-optic phase modulator. As the sinusoidal phase modulation interferometry based on the electro-optic phase modulator has the advantages of high modulation frequency, free of mechanical vibration and so on, it is widely applied to the fibre-optic interferometer, the optical feedback interferometer and the self-mixing interferometer.

In PGC demodulation, the high-frequency phase carrier up-converts the signal to be measured onto the sidebands of the carrier frequency. The fundamental carrier and harmonic carriers carrying the phase information to be measured are contained in the interference signal, and generally the fundamental and second-harmonic terms with larger amplitudes are selected for demodulating the signal to be measured. The interference signal is multiplied by the fundamental and the double-frequency signals of carrier respectively and then filtered by two low-pass filters. A pair of quadrature signals containing the phase information to be measured is obtained, and the phase to be measured is obtained further by the use of the differential cross multiplying (DCM) method or the arctangent (Arctan) method. The algorithm of the DCM method is more complicated, and is prone to affecting by the light intensity change and the interference fringe contrast. The Arctan method is an improved algorithm of PGC demodulation, and it has the beneficial effects that the algorithm is simple, anti-interference ability is strong, the method is easy to achieve and the like. However, in PGC demodulation, phase delay caused by the optical path transmission, drifting of the phase modulation depth, changes of the gains of multipliers or filters or the like may result in a nonlinear error. By normalizing the quadrature signals, the nonlinear error caused by these factors is eliminated. Usually, before the start of experiment, the object to be measured needs to move to produce several interference fringe periods, and the normalization coefficients is obtained according to the peak-to-peak values and other parameters of the quadrature signals in an off-line manner. However, this method is not applicable to a static object such as the absolute distance measurement. In addition, during the measurement, the normalization coefficients may change due to the drifting of the phase modulation depth or the change of the measured displacement, so the normalization coefficients obtained by off-line estimation is not precise any more, and therefore the measurement accuracy is lowered.

SUMMARY OF THE INVENTION

In order to solve the above-mentioned disadvantages in the related art, the present invention is aims to disclose a real-time normalization apparatus and method of the PGC demodulation a sinusoidal phase modulation interferometer.

According to the present invention, the optical setup containing a measuring interferometer and a monitoring interferometer is constructed. An electro-optic phase modulator is placed in the common reference arm of the two interferometers, and a high-frequency sinusoidal modulation and a low-frequency triangular modulation are applied to the electro-optic phase modulator at the same time. The sinusoidal modulation is used for generating phase carrier, and PGC demodulation is performed to obtain the quadrature signals containing the phase information to be measured. The triangular modulation makes the quadrature signals change periodically, ellipse fitting is performed on the Lissajous figure corresponding to the quadrature signals, and real-time normalization of the PGC demodulated quadrature signals is achieved. By calculating the variation of the phase difference between the two interference signals, the measured displacement is obtained, and nanometer displacement measurement is achieved.

The technical solutions adopted by the present invention for solving its technical problem are:

1. A real-time normalization apparatus of the PGC demodulation in a sinusoidal phase modulation interferometer, including a single frequency laser, a first beam splitter, a second beam splitter, a third beam splitter, a fourth beam splitter, a reference retroreflector, a measuring retroreflector, an electro-optic phase modulator, a first photodetector and a second photodetector. The linearly polarized beam with wavelength $\lambda$ emitted from the single frequency laser is incident on the first beam splitter and divided into transmitted and reflected beams. The reflected beam from the first beam splitter is modulated by the electro-optic phase modulator and then projected onto the reference retroreflector. The reflected beam from the reference retroreflector is incident on the second beam splitter and divided into transmitted and reflected beams. The transmitted beam from the first beam splitter is incident on the third beam splitter and divided into transmitted and reflected beams. The transmitted beam from the third beam splitter is projected onto the measuring retroreflector. The reflected beam from the measuring retroreflector and the transmitted beam from the second beam splitter are merged at the first beam splitter to form the measurement interference signal, which is received by the first photodetector. The reflected beam from the third beam splitter and the reflected beam from the second beam splitter are merged at the fourth beam splitter to form the reference interference signal, which is received by the second photodetector. The reference retroreflector is fixed, and the measuring retroreflector is mounted on the object to be measured. The measuring retroreflector and object move together, and the displacement of the measuring retroreflector represents the displacement of the object.

The electro-optic phase modulator is placed between the first beam splitter and the reference retroreflector, and is used to modulate the reflected beam from the first beam splitter projected onto the reference retroreflector.

A high voltage amplifier and a signal generator are also included. The electro-optic phase modulator is connected to the signal generator through the high voltage amplifier. The high-frequency sinusoidal wave voltage and a low-frequency triangular wave voltage output by the signal generator are amplified by the high voltage amplifier and then applied to the electro-optic phase modulator. And the polarization direction of the linearly polarized beam emitted from the single frequency laser is aligned with the direction of the electric field applied to the electro-optic phase modulator.

The first beam splitter, the reference retroreflector and the measuring retroreflector constitute the measuring interferometer. The first beam splitter, the reference retroreflector, the second beam splitter, the third beam splitter and the fourth beam splitter constitute the monitoring interferometer. The first beam splitter, the electro-optic phase modulator, the reference retroreflector and the second beam splitter constitute the common reference arm of the measuring interferometer and the reference interferometer. The periodical high-frequency sinusoidal wave voltage and the low-frequency triangular wave voltage output by the signal generator are applied to the electro-optic phase modulator after being amplified by the high voltage amplifier. The optical path of the common reference arm is modulated by changing the refractive index of electro-optic crystal of the electro-optic phase modulator, thus the high-frequency sinusoidal phase modulation and the low-frequency triangular phase modulation of the measuring interferometer and the monitoring interferometer are achieved.

2. A displacement measurement method based on the real-time normalization of the PGC demodulation in a sinusoidal phase modulation interferometer:

1) Performing identical real-time normalization of the PGC demodulation on the measuring interference signal and the monitoring interference signal detected by the apparatus, and obtaining the demodulated phase values of the measuring and the monitoring interference signals respectively;

In the apparatus, the measuring interference signal and the monitoring interference signal are obtained as following: The linearly polarized beam with wavelength λ emitted from the single frequency laser is projected onto the measuring and reference interferometers to form the measuring and the monitoring interference signals, which are respectively received by the first photodetector and the second photodetector. The measuring interferometer is composed of the first beam splitter, the reference retroreflector and the measuring retroreflector. The monitoring interferometer is composed of the first beam splitter, the reference retroreflector, the second beam splitter, the third beam splitter and the fourth beam splitter.

2) When the measuring retroreflector is moving, the variation of the phase difference between the measuring interference signal and the monitoring interference signal are calculated. Then the measured displacement is given using the following equation:

$$\Delta L = \frac{\Delta \phi(t)}{2\pi} \times \frac{\lambda}{2}$$

where λ is the wavelength of the linearly polarized beam emitted from the single frequency laser.

The measured displacement ΔL serves as the moving displacement of the measuring retroreflector.

In the step 1), the real-time normalization of PGC demodulation is as follows:

By applying the high-frequency sinusoidal phase modulation, the phase carrier signal is generated to perform PGC demodulation.

1.1) The interference signal is multiplied by the high-frequency sinusoidal modulation signal and its double-frequency signal respectively, and then passed through two low-pass filters. The outputs of the filters are divided by the Bessel function value corresponding to the theoretical value z' of phase modulation depth, and then a pair of quadrature signals containing the interference phase information are obtained.

1.2) The low-frequency triangular wave phase modulation makes the quadrature signals of the measuring (monitoring) interferometer change periodically. By performing the ellipse fitting on the Lissajous figure corresponding to the quadrature signals, the values of the major axis and minor axis of the ellipse are measured in real time, which serve as two normalization coefficients of the quadrature signals. Thus, the real-time normalization of the PGC demodulated quadrature signals is achieved.

1.3) Normalizing the quadrature signals obtained in the step 1.2) by using the two normalization coefficients obtained in the step 1.2), the phase of interferometer is obtained after performing the division and arctangent operations on the normalized quadrature signals.

The step 1.2) is completed in the ellipse fitting and normalization coefficient calculating module as shown in FIG. 2.

The normalization of quadrature signals in the step 1.3) is completed in the quadrature signals real-time normalization module as shown in FIG. 2.

The beneficial effects of the present invention are:

(1) The present invention realizes the real-time normalization of the PGC demodulation, the nonlinear phase demodulation error caused by the changes of phase modulation depth and phase delay in the measuring process, or the gain changes of multiplier and filter or other factors is eliminated, and nanometer displacement measurement is achieved.

(2) Whether the measured object is in a static state or a movement state, real-time normalization of PGC demodulation can be achieved. Therefore, the present invention is applicable to both the relative displacement measurement and the absolute distance measurement.

(3) Without using polarizing optics in the optical configuration of the present invention, the first order nonlinear error arising from the polarization error such as non-orthogonal polarization, polarization leakage, etc. is avoided.

(4) The method is simple in optical configuration and convenient to use. The present invention is mainly applied to displacement measurement with sub-nanometer accuracy in such technical fields as ultra-precision fabrication, micro-electronics manufacturing, precision metrology and so on.

In the figures, 1: single frequency laser; 2: first beam splitter; 3: second beam splitter; 4: third beam splitter; 5: fourth beam splitter; 6: reference retroreflector; 7: measuring retroreflector; 8: electro-optic phase modulator; 9: high voltage amplifier; 10: signal generator; 11: first photoelectric detector; 12: second photoelectric detector; 13: interference signal; 14: sinusoidal modulation signal; 15: frequency multiplier; 16: multiplier; 17: multiplier; 18: low-pass filter; 19: low-pass filter; 20: divider; 21: divider; 22: ellipse fitting and normalization coefficient calculating module ; 23: quadrature signals real-time normalization module; 24: divider; and 25: arctangent operation.

DESCRIPTION OF THE EMBODIMENTS

The present invention is further described in details hereinafter with the Figures and Embodiments.

Figure 1:
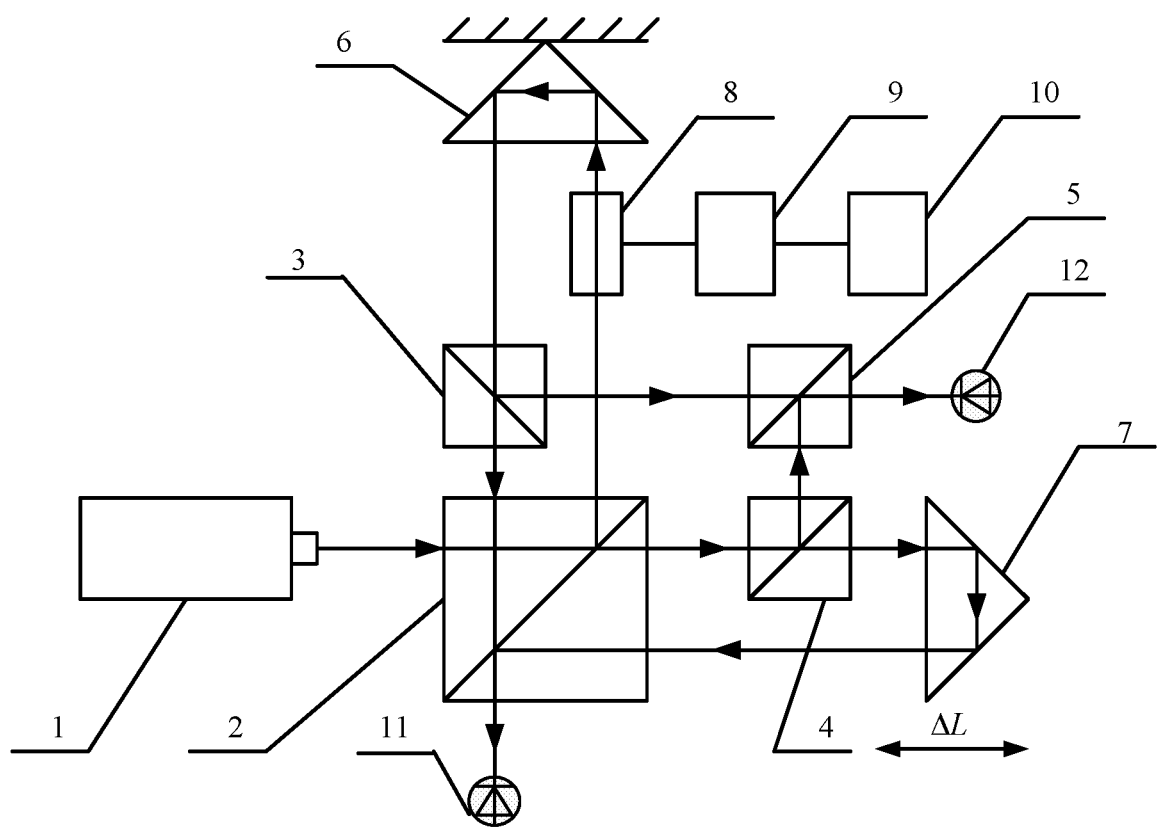
FIG. 1 is the schematic diagram of the apparatus of the present invention.

As shown in FIG. 1, the apparatus of the present invention comprises a single frequency laser 1, a first beam splitter 2, a second beam splitter 3, a third beam splitter 4, a fourth beam splitter 5, a reference retroreflector 6, a measuring retroreflector 7, an electro-optic phase modulator 8, a first photoelectric detector 11 and a second photoelectric detector 12. The linearly polarized beam with wavelength $\lambda$ emitted from the single frequency laser 1 is incident on the first beam splitter 2 and divided into transmitted and reflected beams. After being modulated by the electro-optic phase modulator 8, the reflected beam from the first beam splitter 2 is projected onto the reference retroreflector 6. Then the reflected beam from the reference retroreflector 6 is incident on the second beam splitter 3 and divided into transmitted and reflected beams. The transmitted beam from the first beam splitter 2 is incident on the third beam splitter 4 and divided into transmitted and reflected beams. The transmitted beam from the third beam splitter 4 is projected onto the measuring retroreflector 7. The reflected beam from the measuring retroreflector 7 and the transmitted beam from the second beam splitter 3 are merged at the first beam splitter 2 to form the measurement interference signal, which is received by the first photodetector 11. The reflected beam from the third beam splitter 4 and the reflected beam from the second beam splitter 3 are merged at the fourth beam splitter 5 to form the reference interference signal, which is received by the second photodetector 12. The reference retroreflector 6 is fixed, and the measuring retroreflector 7 is mounted on the object to be measured. The measuring retroreflector 7 and object move together, and the displacement of the measuring retroreflector 7 represents the displacement of the object.

The high-frequency sinusoidal wave and a low-frequency triangular wave output by the signal generator 10 are amplified by the high voltage amplifier 9 and then applied to the electro-optic phase modulator 8. The electro-optical phase modulator 8 is placed in the common reference arm of the measuring interferometer and a monitoring interferometer. And the polarization direction of the linearly polarized beam emitted from the single frequency laser 1 is aligned with the direction of the electric field applied to the electro-optic phase modulator 8.

The specific implementation for the present invention includes the following steps:

The modulation voltage signal is applied to the electro-optic phase modulator 8:

$$V(t)=\beta(V_{\omega_1}(t)+V_{\omega_2}(t))=\beta[A\cos\omega_1 t + B tri(\omega_2 t)] \quad (1)$$

where $\beta$ is the amplification factor of the high voltage amplifier 9, $V_{\omega_1}(t)=A\cos\omega_1 t$ and $V_{\omega_2}(t)=B tri(\omega_2 t)$ are the sinusoidal wave and the triangular wave output from the signal generator 10, respectively; A and $\omega_1$ are the amplitude and the angle frequency of the sinusoidal modulation signal, respectively; B and $\omega_2$ are the amplitude and the angle frequency of the triangular wave modulation signal, respectively; and t is time.

$tri(\omega_2 t)$ is a unit triangular wave function, which is expressed as:

$$tri(\omega_2 t) = 1 - 2\frac{|\omega_2 t - 2n\pi|}{\pi}, \; -\frac{\pi}{\omega_2}+\frac{2n\pi}{\omega_2} \le t \le \frac{\pi}{\omega_2}+\frac{2n\pi}{\omega_2}, \quad (2)$$

$$n \in Z$$

where n is the period number of the triangular wave, and Z represents the set of integers.

Then the phase change $\varphi_{EOM}$ caused by the electro-optic phase modulator 8 is:

$$\varphi_{EOM} = \frac{\pi\beta A}{V_\pi}\cos\omega_1 t + \frac{\pi\beta B}{V_\pi} tri(\omega_2 t) \quad (3)$$

where $V_\pi$ is the half-wave voltage of the electro-optic phase modulator 8.

The linearly polarized beam with wavelength $\lambda$ emitted from the single frequency laser 1 is projected onto the measuring interferometer composed of the first beam splitter 2, the reference retroreflector 6 and the measuring retroreflector 7 and the monitoring interferometer composed of the first beam splitter 2, the reference retroreflector 6, the second beam splitter 3, the third beam splitter 4 and the fourth beam splitter 5. The measuring interference signal and the reference interference signal are respectively formed, and are respectively received by the first photoelectric detector 11 and the second photoelectric detector 12.

Denoting the interferometer composed of the first beam splitter 2, the reference retroreflector 6 and the measuring retroreflector 7 as the measuring interferometer, denoting the interferometer composed of the first beam splitter 2, the reference retroreflector 6, the second beam splitter 3, the third beam splitter 4 and the fourth beam splitter 5 as the monitoring interferometer, and denoting $l_1$ and $l_2$ as the initial optical path differences between the two arms of the measuring interferometer and the monitoring interferometer before the electro-optical phase modulator 8 is applied to voltage modulation, respectively, the measuring interference signal $S_1(t)$ and a monitoring interference signal $S_2(t)$ received by the first photoelectric detector 11 and the second photoelectric detector 12 are respectively shown as follows:

$$S_1(t) = S_{01} + S_{11}\cos\left\{\frac{\pi\beta A}{V_\pi}\cos(\omega_1 t - \theta_1) + \frac{\pi\beta B}{V_\pi}tri(\omega_2 t) + \frac{2\pi l_1}{\lambda}\right\} \quad (4)$$
$$= S_{01} + S_{11}\cos[z\cos(\omega_1 t - \theta_1) + \varphi_1(t)]$$

$$S_2(t) = S_{02} + S_{12}\cos\left\{\frac{\pi\beta A}{V_\pi}\cos(\omega_1 t - \theta_2) + \frac{\pi\beta B}{V_\pi}tri(\omega_2 t) + \frac{2\pi l_2}{\lambda}\right\} \quad (5)$$
$$= S_{02} + S_{12}\cos[z\cos(\omega_1 t - \theta_2) + \varphi_2(t)]$$

where $S_{01}$ and $S_{02}$ are the amplitudes of the direct current components of the measuring interference signal and the reference interference signal, respectively; $S_{11}$ and $S_{12}$ are the amplitudes of alternating current components of the measuring interference signal and the reference interference signal, respectively; $\lambda$ is the wavelength of the linearly polarized beam emitted from the single frequency laser 1; z is the sinusoidal phase modulation depth and $z=\pi\beta A/V_\pi$; $\theta_1$ and $\theta_2$ are the carrier phase delays corresponding to the measuring interferometer and the monitoring interferometer, respectively; and $\varphi_1(t)$ and $\varphi_2(t)$ are the phases to be demodulated corresponding to the measuring interferometer and the monitoring interferometer, respectively.

$$\varphi_1(t) = \frac{\pi\beta B}{V_\pi}tri(\omega_2 t) + \frac{2\pi l_1}{\lambda} \quad (6)$$

$$\varphi_2(t) = \frac{\pi\beta B}{V_\pi}tri(\omega_2 t) + \frac{2\pi l_2}{\lambda} \quad (7)$$

As can be seen from the Eqs. (6) and (7), the phases of the two interferometers periodically change with the modulation of the triangular wave signal $tri(\omega_2 t)$.

In order to demodulate the phases $\varphi_1(t)$ and $\varphi_2(t)$ corresponding to the measuring interferometer and the monitoring interferometer, the interference signal $S_i(t)$ (i=1, 2, wherein i=1 represents the measuring interference signal, and i=2 represents the monitoring interference signal) is expanded into the following form:

$$S_i(t) = S_{0i} + S_{1i}\cos\varphi_i(t)\left[J_0(z) + 2\sum_{m=1}^{\infty}(-1)^m J_{2m}(z)\cos 2m(\omega_1 t - \theta_i)\right] + \quad (8)$$
$$S_{1i}\sin\varphi_i(t)\left[-2\sum_{m=1}^{\infty}(-1)^m J_{2m-1}(z)\cos(2m-1)(\omega_1 t - \theta_i)\right],$$

where $S_{0i}$ is the amplitude of the direct current component of the measuring interference signal or the reference interference signal; $S_{1i}$ is the amplitude of the alternating current component of the measuring interference signal or the reference interference signal; $J_{(2m-1)}(z)$ and $J_{2m}(z)$ denote the odd- and even-order Bessel functions, respectively; and $J_0(z)$ is the zero order Bessel function.

Figure 2:
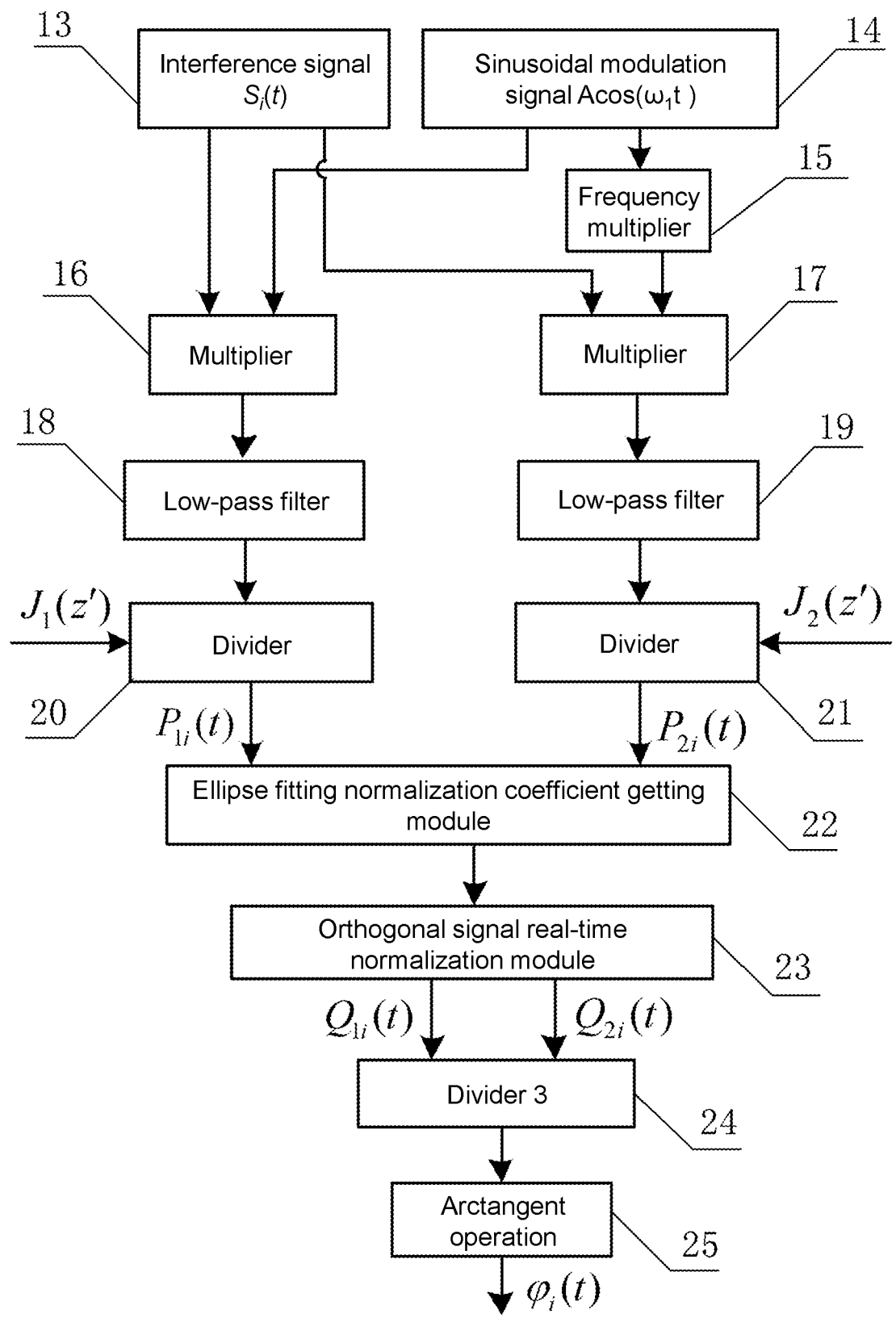
FIG. 2 is the schematic diagram of the real-time normalization of the PGC demodulation in the present invention.

The principle of the real-time normalization of the PGC demodulation is shown in FIG. 2. With the multiplier 16 and the multiplier 17, the interference signal 13 is respectively multiplied by the sinusoidal modulation signal 14 and its double-frequency signal output by the frequency multiplier 15. The outputs of multiplier 16 and multiplier 17 are respectively filtered with two lower-pass filters 18 and 19. The outputs of filters 18 and 19 are respectively divided by the first-order Bessel function value $J_1(z')$ and the second-order Bessel function value $J_2(z')$ through the divider 20 and the divider 21. The $J_1(z')$ and $J_2(z')$ are calculated according to the theoretical value z' of the phase modulation depth. Then, a pair of quadrature signals containing phase information of the interferometer are obtained as:

$$P_{1i}(t) = \frac{LPF[S_i(t) \cdot V_{\omega_1}(t)]}{J_1(z')} = -\frac{J_1(z)}{J_1(z')}K_{1i}S_{1i}A\cos\theta_i\sin\varphi_i(t) \quad (9)$$

$$P_{2i}(t) = \frac{LPF[S_i(t) \cdot V_{2\omega_1}(t)]}{J_2(z')} = -\frac{J_2(z)}{J_2(z')}K_{2i}S_{1i}A\cos 2\theta_i\cos\varphi_i(t) \quad (10)$$

where $P_{1i}(t)$ and $P_{2i}(t)$ are respectively the sine item and the cosine item of the quadrature signals, $K_{1i}$ is the total gain of the multiplier 16 and the low-pass filer 18, $K_{2i}$ (i=1,2) is the total gain of the multiplier 17 and the low-pass filter 19, LPF[ ] means low-pass filtering, $V_{\omega_1}(t)$ is the sinusoidal modulation signal, $V_{\omega_2}(t)$ is the double-frequency signal of the sinusoidal modulation signal, and $S_{1i}$ (i=1,2, wherein i=1 represents the measuring interference signal, and i=2 represents the monitoring interference signal) shows the alternating current component amplitude of the interference signal.

It can be seen that due to the difference (z≠z') between the theoretical value z' and the actual value z of the phase modulation depth, unequal gain or gain change ($K_{1i}\neq K_{2i}$) of the multiplier and the low-pass filter and the carrier phase delay $\theta_i$, the amplitude values of the sinusoidal signals are unequal. This will result in a nonlinear error during phase demodulation.

As $P_{1i}(t)$ and $P_{2i}(t)$ change periodically with triangular wave modulation, ellipse fitting is performed on Lissajous figures of $P_{1i}(t)$ and $P_{2i}(t)$ through the ellipse fitting and normalization coefficient calculating module 22, the major axis $\alpha_{1i}=-J_1(z)K_{1i}S_{1i}A\cos\theta_i/J_1(z')$ and the minor axis $\alpha_{2i}=-J_2(z)K_{2i}S_{1i}A\cos 2\theta_i/J_2(z')$ of the ellipse can be obtained, and $\alpha_{1i}$ and $\alpha_{2i}$ serve as the normalization coefficients of the quadrature signals in PGC demodulation.

The quadrature signals real-time normalization module 23 is utilized for performing normalization correction on $P_{1i}(t)$ and $P_{2i}(t)$ to obtain:

$$Q_{1i}(t) = \frac{P_{1i}(t)}{\alpha_{1i}} = \sin\varphi_i(t) \quad (11)$$

$$Q_{2i}(t) = \frac{P_{2i}(t)}{\alpha_{2i}} = \cos\varphi_i(t) \quad (12)$$

It can be seen that, the Lissajous figure corresponding to the corrected quadrature signals is a unit circle, and the nonlinear error of phase demodulation is eliminated. By using the divider 24 and the arctangent operation 25, the phases of the measuring and reference interferometers are obtained with $Q_{1i}(t)$ and $Q_{2i}(t)$:

$$\varphi_i(t) = \arctan\frac{Q_{1i}(t)}{Q_{2i}(t)} \quad (13)$$

According to Eqs. (6) and (7), the initial phase difference $\phi(t)$ between the two interference signals is:

$$\phi(t) = \varphi_1(t) - \varphi_2(t) = \frac{2\pi}{\lambda}(l_1 - l_2) \quad (14)$$

As can be seen from the Eq. (14), the phase modulation of the interference signals caused by triangular wave modulation is counteracted, and the phase difference between the two interference signals is only relevant to the initial optical path difference between the two arms of the two interferometers.

When the movement displacement of the measuring retroreflector 7 is $\Delta L$, $l_1$ is changed into $l_1+2\Delta L$. The phase difference $\phi'(t)$ between the two interference signals becomes:

$$\phi'(t) = \varphi_1(t) - \varphi_2(t) = \frac{2\pi}{\lambda}(l_1 + 2\Delta L - l_2) \quad (15)$$

Denoting $\Delta\phi(t)=\phi'(t)-\phi(t)$, according to the Eqs. (14) and (15), the movement displacement $\Delta L$ of the measuring retroreflector 7 is obtained as:

$$\Delta L = \frac{\Delta\phi(t)}{2\pi} \times \frac{\lambda}{2} \quad (16)$$

In the embodiment of the present invention, the laser source is the single frequency He—Ne stabilized laser with the model of XL80 made by Renishaw Company from England, which emits a linearly polarized beam. And the laser wavelength $\lambda$ is typically 632.990577 nm. The accuracy of PGC phase demodulation can reach 0.2° by performing the real-time normalization. Thereby, by substituting these typical values into Eq. (16), the obtained displacement measuring accuracy is 0.18 nm.

As can be seen from the embodiment, the present invention realizes real-time normalization of the PGC demodulation. The nonlinear error of phase demodulation caused by changes of the phase modulation depth and the phase delay, unequal gain or gain change of the multiplier and the filter, etc. can be eliminated and the sub-nanometer displacement measurement accuracy has realized. In addition, the present invention is applicable to both the relative displacement measurement and the absolute distance measurement. The present invention has the advantages of wide application range, simple optical configuration, convenient to use and remarkable technical effects.

What is claimed is:

1. A real-time normalization apparatus of a phase generated carrier (PGC) demodulation in a sinusoidal phase modulation interferometer, comprising a single frequency laser, a first beam splitter, a second beam splitter, a third beam splitter, a fourth beam splitter, a reference retroreflector, a measuring retroreflector, an electro-optic phase modulator, a first photoelectric detector, a second photoelectric detector, a high voltage amplifier and a signal generator; a linearly polarized beam emitted from the single frequency laser is directed to the first beam splitter and divided into transmitted and reflected beams; the reflected beam from the first beam splitter is modulated by the electro-optic phase modulator and then projected onto the reference retroreflector; the reflected beam from the reference retroreflector is incident on the second beam splitter and divided into transmitted and reflected beams; the transmitted beam from the first beam splitter is incident on the third beam splitter and divided into transmitted and reflected beams; the transmitted beam from the third beam splitter is projected onto the measuring retroreflector; the reflected beam from the measuring retroreflector and the transmitted beam from the second beam splitter are merged at the first beam splitter to form the measurement interference signal, which is received by the first photodetector; the reflected beam from the third beam splitter and the reflected beam from the second beam splitter are merged at the fourth beam splitter to form the reference interference signal, which is received by the second photodetector; the reference retroreflector is fixed, and the measuring retroreflector is mounted on the object to be measured; the electro-optical phase modulator is connected to the signal generator through the high voltage amplifier, and a high-frequency sinusoidal wave voltage and a low-frequency triangular wave voltage output by the signal generator are amplified by the high voltage amplifier and then applied to the electro-optic phase modulator; the polarization direction of the linearly polarized beam emitted from the signal frequency laser is aligned with the direction of the electric field applied to the electro-optic phase modulator.

2. The real-time normalization apparatus of the PGC demodulation in the sinusoidal phase modulation interferometer according to claim 1, wherein the electro-optic phase modulator is placed between the first beam splitter and the reference retroreflector, and is used to modulate the reflected beam from the first beam splitter projected onto the reference retroreflector.

3. The real-time normalization apparatus of the PGC demodulation in the sinusoidal phase modulation interferometer according to claim 1, wherein the first beam splitter, the reference retroreflector and the measuring retroreflector constitute a measuring interferometer; the first beam splitter, the reference retroreflector, the second beam splitter, the third beam splitter and the fourth beam splitter constitute a monitoring interferometer; the first beam splitter, the electro-optic phase modulator, the reference retroreflector and the second beam splitter constitute a common reference arm of the measuring interferometer and the reference interferometer; the periodic high-frequency sinusoidal wave voltage and the low-frequency triangular wave voltage output by the signal generator are applied to the electro-optic phase modulator after being amplified by the high voltage amplifier, and an optical path difference of the common reference arm is modulated by changing a refractive index of electro-optic crystal of the electro-optic phase modulator, a high-frequency sinusoidal phase modulation and a low-frequency triangular wave phase modulation of the measuring interferometer and the monitoring interferometer are realized.

4. A displacement measurement method based on the real-time normalization of the PGC demodulation in the sinusoidal phase modulation interferometer applied to the apparatus according to claim 1, comprising 1) performing identical real-time normalization of PGC demodulation on the measuring interference signal and the monitoring interference signal detected by the apparatus, and obtaining demodulated phase values of the measuring and the monitoring interference signals respectively;

2) when the measuring retroreflector is moving, the variation of the phase difference between the measuring interference signal and the monitoring interference signal are calculated, and the measured displacement is given using the following equation:

$$\Delta L = \frac{\Delta\phi(t)}{2\pi} \times \frac{\lambda}{2}$$

where $\lambda$ is a wavelength of the linearly polarized beam emitted from the single frequency laser; and the measured displacement ΔL serves as a movement displacement of the measuring retroreflector.

5. The displacement measurement method based on the real-time normalization of the PGC demodulation in a sinusoidal phase modulation interferometer according to claim 4, wherein in the step 1), the real-time normalization of the PGC demodulation is realized by applying the high-frequency sinusoidal phase modulation to generate a phase carrier signal for performing the PGC demodulation:

1.1) the interference signal is multiplied by a high-frequency sinusoidal modulation signal and its double-frequency signal respectively, passed through two low-pass filters, the outputs of the filters are divided by Bessel function values corresponding to a theoretical value z' of phase modulation depth, and then a pair of quadrature signals containing the interference phase information are obtained, 1.2) performing ellipse fitting on a Lissajous figure corresponding to quadrature signals, values of a major axis and a minor axis of an ellipse are measured in real time, which serve as two normalization coefficients of the quadrature signals; and 1.3) normalization the pair of quadrature signals obtained in the step 1.2) by using two normalization coefficients obtained in the step 1.2), the phase of interferometer is obtained after performing division and arctangent operations on the normalized quadrature signals.

* * * * *